(12) United States Patent
Li

(10) Patent No.: US 6,751,946 B2
(45) Date of Patent: Jun. 22, 2004

(54) DUCTED FAN INTEGRATED POWER PLANT UNIT HAVING PROPELLER WITH CENTRAL BLADE WHEEL

(75) Inventor: Kit Wah Li, Kln. (HK)

(73) Assignee: Kamdax Development Ltd., Kwai Chung (HK)

(*) Notice: Subject to any disclaimer, the term of this patent is extended or adjusted under 35 U.S.C. 154(b) by 0 days.

(21) Appl. No.: 10/457,368

(22) Filed: Jun. 10, 2003

(65) Prior Publication Data

US 2003/0196426 A1 Oct. 23, 2003

Related U.S. Application Data

(63) Continuation-in-part of application No. 10/050,141, filed on Jan. 18, 2002.

(51) Int. Cl.⁷ ................................................. F02F 3/00
(52) U.S. Cl. ..................... 60/269; 123/41.65; 415/7.7
(58) Field of Search ................... 60/269; 123/41.65; 415/77, 199.5, 208.2, 211.2

(56) References Cited

U.S. PATENT DOCUMENTS 4,250,658 A * 2/1981 Kress .......................... 446/56
4,685,289 A * 8/1987 Violett et al. ................ 60/269

FOREIGN PATENT DOCUMENTS

| DE | 0154328 | * | 3/1982 |
| FR | 2238321 | * | 2/1975 |

* cited by examiner

Primary Examiner—Justine R. Yu
Assistant Examiner—William H. Rodriguez
(74) Attorney, Agent, or Firm—Rabin & Berdo, P.C.

(57) ABSTRACT

A ducted fan integrated power plant unit having a propeller with a central blade wheel comprises a ducted fan stator, which stator includes an outer ring having the central air intake guide ring, an inner ring; stator guide blades connecting the outer ring and the inner ring and a fixing support, a propeller, which includes main blades, a retaining ring, the later has central conical blades, between which guide openings are formed, and an engine and a fuel tank etc. When they are mounted together, the inner ring opening of the stator can be communicated with the guide openings, thereby the air flow volume is increased and air stream can be also guided to be exhausted towards the rear by these openings, at the same time the crankcase of the engine can be effectively cooled and the power and propulsion of engine can be increased.

10 Claims, 3 Drawing Sheets

DUCTED FAN INTEGRATED POWER PLANT UNIT HAVING PROPELLER WITH CENTRAL BLADE WHEEL

RELATED CASES

This invention is a Continuation-In-Part of my patent application, Ser. No. 10/050,141, filed Jan. 18, 2002.

FIELD OF THE INVENTION

The present utility model relates to a ducted fan power plant unit of a model airplane, and more particularly to a ducted fan integrated power plant unit having a propeller with central blade wheel.

BACKGROUND OF THE INVENTION AND PRIOR ART

At present, most ducted fan power plant units of model airplanes adopt a design of a straight duct, i.e. the duct fan and the duct stator outer ring are of a straight line design. Therefore, the diameter or area of the air intake port of the duct fan is equal to that of the air exhaust port of the duct stator outer ring. When the air drawn in by the duct fan is exhausted rearwards after it passes through the duct stator outer ring to the air exhaust port, the acceleration of the air exhaust flow is only proportional to the rotating speed of the engine of the duct fan.

In addition, in the prior art, due to the fact that the diameter of the spinner and the central shaft is relatively large, the area of the air intake port of the fan is reduced, and the model airplane is driven only by the blades of the propeller. When high speed flying is needed, the amount of air admission for combustion of the engine is not enough so that air and fuel in the engine can not be mixed adequately, resulting in a reduced work efficiency. Furthermore, in the structure of the duct stator having an outer ring and an inner ring, an air stream passes through only the space between the outer ring and the inner ring of the duct stator. The air, after passing through the stator guide blades arranged between the outer ring and the inner ring, is exhausted rearwards. In this case, no air flow occurs in the stator inner ring. This region (where no air passes through), is right next and most close to the central region where the engine is located. The result is a disordered air flow will occur in this region, and the air flow speed will be adversely influenced, which leads to a reduction of a propulsive force of the model airplane. At the same time, the surrounding region of the central portion of the engine suffers from poor cooling because no air flows through there, and enough air cannot be supplied for the combustion of the fuel. Thereby the engine cannot achieve good working efficiency and due high rotating speed. Accordingly, the rated power of engine cannot be fully brought into play or properly used.

The drawback of the straight duct design and the insufficiency of cooling capability of the prior art ducted fan power plant unit leads to a significantly reduced ratio of actual power to the rated power of the power plant unit. At the same time, the propulsion of the model airplane in the sky decreases with the decreasing power.

On the other hand, the existing ducted fan system of the model airplane suffers from a relatively complicated structure, and a greater number of components. For example, such unit is generally composed of separated blades of propeller and its retaining ring, stator guide blades of the duct stator and its fixing ring, as well as a hundreds of connectors and fasteners of different types and models, which not only leads to an increase of the weight of the ducted fan power plant unit, but also to an increase number of mounting procedures and to the requirement for a high operation technique. The result is, for most model airplane amateurs and beginners, due to the non-ideal effect in use, many problems will occur in operation and assembly of the model airplane, therefore an improvement is urgently needed indeed.

The purpose of the present utility model is to overcome the above mentioned drawbacks and to provide a ducted fan power plant unit having a propeller with a central blade wheel, the unit has a central blade wheel which can draw air flow at the central portion, and the air drawn-in by the central blade wheel can synchronously function with the air flow of the main blades of the propeller to improve and enhance the quality and the amount or volume of the air blowing.

SUMMARY OF THE INVENTION

The technical scheme for realizing the object of the present utility model is: a kind of ducted fan power plant unit with propeller having central blade wheel, it comprises a ducted fan stator, which includes an outer ring, an inner ring, several blade shaped connecting bars which connect the outer ring and the inner ring and which can act as stator guide blades, and a fixing support arranged on one side of the inner ring, in the front portion of the outer ring of the ducted fan stator, a conical air intake guide ring is provided for increasing the intake of air flow, the inner diameter of which is larger outside than inside, an air exhaust duct, which is connected to the rear portion of the ducted fan stator, the air exhaust duct and the ducted fan stator have a common central axis, an internal combustion engine having an fuel intake port and a fuel tank having an fuel supplying port, they are mounted one after other on the fixing support and are situated in the air exhaust duct, in addition, the fuel supplying port of the fuel tank is communicated with the fuel intake port of the internal combustion engine through the fuel pipe, a propeller, which includes several main blades, a conical retaining ring, the conical retaining ring has a central shaft hole and several central conical blades as the blade wheel arranged in the retaining ring, on the periphery of the retaining ring are provided the main blades, the said propeller can be mounted on the power shaft of the engine through the central shaft hole of the retaining ring, a cap, which is conical and mounted on the end portion of the power shaft and is situated in the center portion of the retaining ring of the propeller so that the central conical blades can be exposed to the outside of the cap, and the spaced guide between two adjacent central conical blades can be communicated with the inner ring opening of the inner ring of the ducted fan stator.

As the above mentioned ducted fan integrated power plant unit having a propeller with central blade wheel, wherein on the inner surface of ducted fan stator inner ring are provided several radial uniformly distributed blade-shaped inner ring guide blades.

As the above mentioned ducted fan integrated power plant unit having a propeller with central blade wheel, wherein the power plant unit further includes a tail cap of the fuel tank, which is mounted on the rear end of the fuel tank.

As the above mentioned ducted fan integrated power plant unit having a propeller with central blade wheel, wherein the outer diameter of the end portion of the main blades is gradually reduced from the front to the rear, and the end portion has approximately the same inclination angle as that of the peripheral surface of the central air intake guide ring.

It can be seen from the above that the propeller of the ducted fan integrated power plant unit having a propeller with central blade wheel according to the present utility model has several main blades and several central conical blades of the blade wheel which operate or rotate synchronously with the main blades to generate a main air stream M and a central suction air stream T respectively, the ducted fan stator has inner ring guide blades, stator guide blades and conically tapered air intake guide ring, hence the amount of air supply can be increased and air flow can be guided to be exhausted rearwards in a straight line manner to prevent from the occurrence of disordered air flow. At the same time, the air flows drawn by the central conical blades can cool the mixed gas in the crankcase of the engine and the density of the mixed gas can be increased, thereby the compression ratio can be increased, and the successful start rate and the propulsive force can be improved or raised. The engine of the ducted fan integrated power plant unit can use conventional two-stroke engine of the model airplane, the engine makes the propeller of the ducted fan power plant unit rotate to draw in air at the front end, and after the air enters the stator through the cone tapered air intake guide ring and passes through the stator guide blades of the fan duct stator, it is exhausted rearwards, so as to join with the central suction or drawn-in air flow of the inner ring of the stator guide blades, then passing through the outlet of the ducted fan stator and the fuel tank in the central position, exhausting rearward air with large volume and at high speed to generate strong propulsive force. The present utility model features also the simple and integrated structure, high efficiency and lightweight.

DESCRIPTION OF PREFERRED EMBODIMENTS

Figure 1:
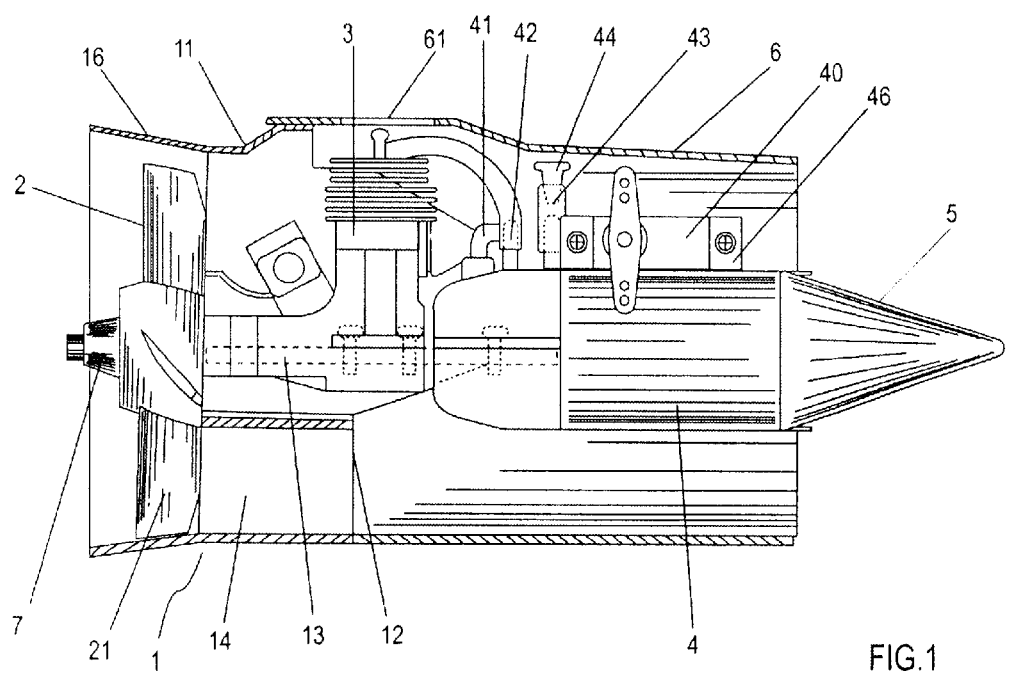
FIG. 1 is a cut-away schematic view of the structure of an embodiment of the present utility model.
Figure 2:
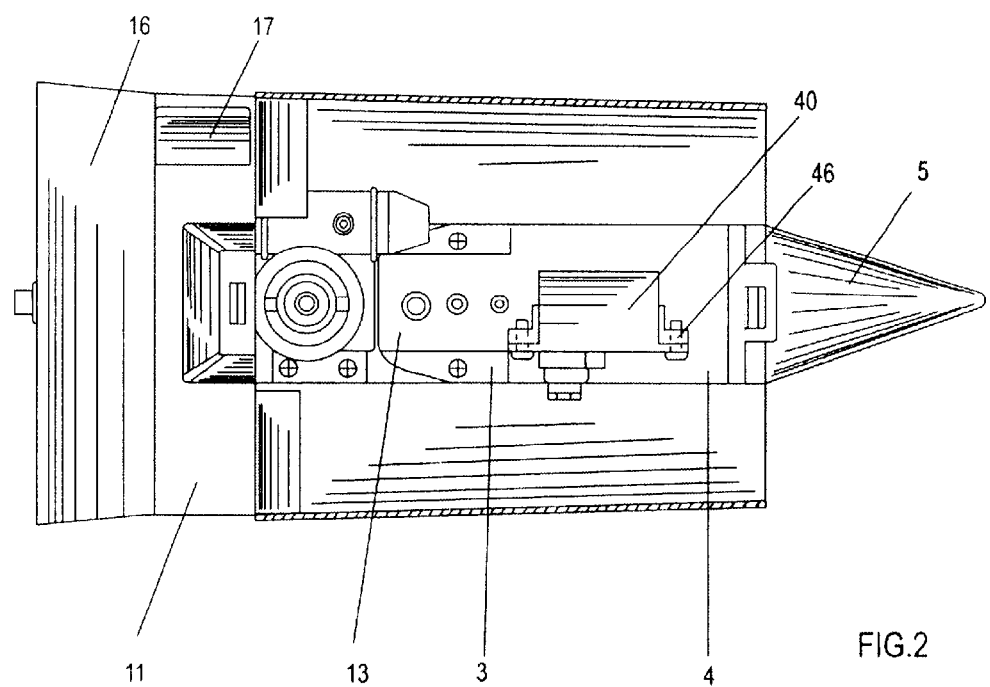
FIG. 2 is a plan view of FIG. 1.

Referring to FIG. 1 to FIG. 4, a ducted fan integrated power plant unit having a propeller with central blade wheel mainly comprises a ducted fan stator 1, a propeller 2, an internal combustion engine 3, a fuel tank 4, a tail cap 5, an air exhaust duct 6 and a cover 7. The ducted fan stator 1 includes an outer ring 11, an inner ring 12, a fixing support 13, in which, the outer ring 11 and the inner ring 12 are connected by several radial connecting bars. These bars have the shape of fan blades which can function as or become stator guide blades 14 and can act as support for supporting the outer ring 11 and the inner ring 12. The fixing support 13 is provided on the one side of the inner ring and situated parallel to and under the central axis of the ducted fan stator 1. In a preferred embodiment of the present utility model, on the inner surface of the inner ring 12 of the ducted fan stator 1 are provided several radially and uniformly distributed inner ring guide blades 15 with equal length and radiating blade shape to increase the air flow speed entering the duct body of the stator, when the model airplane is in flight. In addition, at the front portion of the outer ring 11 of the duct stator 1, a cone-shaped front portion with the inner diameter being reduced gradually from the outside (upstream) to the inside (downstream) is formed to act as an air intake guide ring 16.

A fixing member 17 for fixing the power plant unit is disposed on the outer ring 11 of the ducted fan stator, with which the ducted fan power plant unit having a propeller with central blade wheel and the power plant unit can be easily mounted under the wings of the model airplane or in the mounting slots on the both sides of its inner wall within the body of the model airplane, which slot is engaged with the fixing member 17.

The propeller 2 has several main blades 21 and a blade retaining ring 22. The retaining ring 22 is of a conic shape and has a central shaft hole. The retaining ring 22 has several radially and uniformly distributed, central blade wheel like central cone shaped blades 23 are provided therein. Between each of two adjacent central conical blades 23, a spaced guide opening 24 is formed. Generally, the outer diameter of the end of the main blades 21 is gradually reduced from the front to the rear and has the same inclining angle as the inner periphery of the central air intake guide ring 16 to match the conically reduced tapered air intake ring 16, the inner diameter (root portion) of which is gradually enlarged to match the outer periphery of the retaining ring 22 of the central conical blades 23 which is enlarged from the front to the rear.

The cover 7 is a cone-shaped spinner with a relatively smaller outer diameter. It is mounted on the free end of the power shaft of the engine through mounting screws or mounted on the shaft end and is mounted against the central portion of the retaining ring 22 of the propeller 2, so that the front surface of the central cone-shaped blades 23 is not covered, i.e. is exposed to the outside. Therefore the spaced guide openings between adjacent central conical blades 23 of the retaining ring 22 can be communicated with the inner ring hole of the inner ring 12 of the said duct stator 1 so that the air flow can enter the guide openings through the front portion of the retaining ring 22 and pass through the inner ring hole to flow into the rear of the duct stator 1, and simultaneously a part of the air flow can act on the inner ring guide blades 15 to make the air to flow towards the engine 3 to increase the cooling effect on the engine.

The internal combustion engine 3 is a kind of engine with crankcase and power shaft, thus the propeller 2 can be mounted on the power shaft of the internal combustion engine via the central shaft hole.

The fuel tank 4 is a lightweight, streamlined fuel tank. There are provided two props 46 on the top of the fuel tank 4, and on the top of the tank 4 are also provided a fuel supplying port, an air filling port and a fuel supplementing port, and the corresponding fuel supplying pipe 41, air filling pipe 42 and fuel supplementing pipe 43 are provided. In addition, the fuel tank 4 is equipped generally with a controlling servo 40 which is mounted on props 46 of the fuel tank 4 and is used for controlling the throttle of the engine, in which the servo 40 is an independent unit which outputs power and which is remote controllable. The internal combustion engine 3 and the fuel tank 4 can be easily and accurately mounted on the fixing support 13 of the ducted fan stator 1 by means of screws, and the fuel inlet port of the internal combustion engine 3 is communicated with the outlet port of the fuel tank 4 via fuel intake pipe 41. The air inlet port is connected to the air filling port of the fuel tank 4 through the air filling pipe 42, while the fuel supplementing port of the fuel tank has the fuel supplementing pipe 43 with a plug 44 to supply fuel from outside. Therefore in the internal combustion engine 3, the fuel from the fuel tank 4 and the air supplied by air filling pipe 42 can be combined fully and adequately. After the mixture is ignited the explosion occurs to produce force and make the crankshaft of the engine 3 to rotate and transmit the rotational force to the propeller 2 mounted on the power shaft of the engine 3.

The tail cap 5 is a cone-shaped cap. A clipping port is provided at its front portion, over which clipping port a rubber sealing ring or rubber seal is placed. The tail cap 5 is mounted through the clipping port in a sealed manner on the rear end of the fuel tank 4 by a pair of mobile buckles (buckling positions) oppositely disposed. With such a mounting method, the tail cap can be easily mounted on or dismounted from the fuel tank 4, i.e. the mounting and repairing are very convenient. With the combination of the tail cap 5 with the streamlined fuel tank, which is of a simple structure design, lightweight results in, what is more important, it can concentrate the air flow which is rearwards exhausted at high speed to prevent the occurrence of disordered air flow.

The air exhaust duct 6 is a round-shaped thin duct, the inner diameter of which is gradually reduced or gradually tapered from the front to the rear in order to speed up the speed of the exhausted air flow. If a protruding buckle (buckling position) is provided on each of the two oppositely positioned upper and lower sides of the rear end port of the ducted fan stator 1, then a recessed buckle (buckling position) is provided on each of the two oppositely positioned upper and lower sides of the front end port of the air exhaust duct 6, the air exhaust duct 6 is fixed on the rear portion of the ducted fan stator through the engagement of the recessed buckle thereof with the protruding buckle of the ducted fan stator. In addition, on the top end of the front portion of the air exhaust duct 6 is provided a round hole 61 which is used to pass the igniter through the air exhaust duct 6 when starting the engine 3 and to energize electrically the pre-heater on the top of engine 3.

Figure 3:
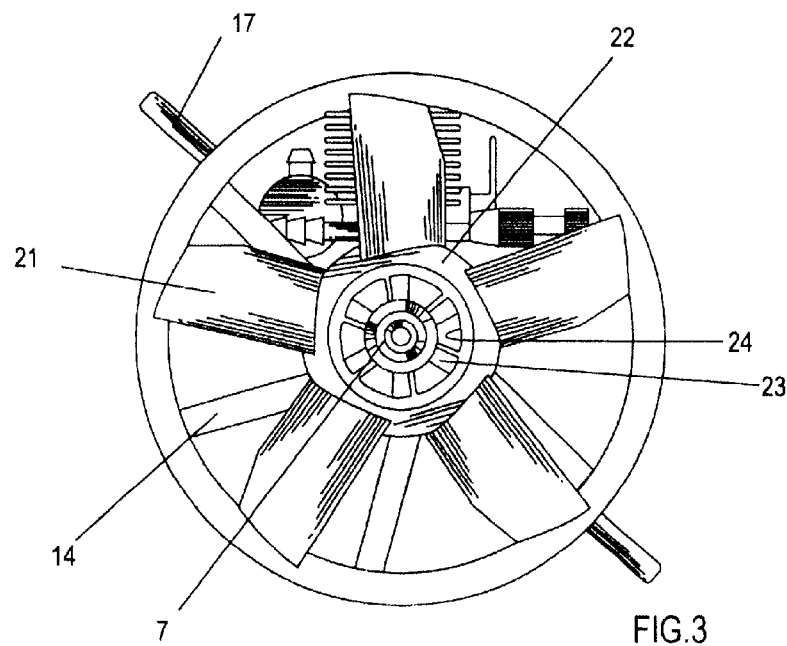
FIG. 3 is a left view of FIG. 1.
Figure 4:
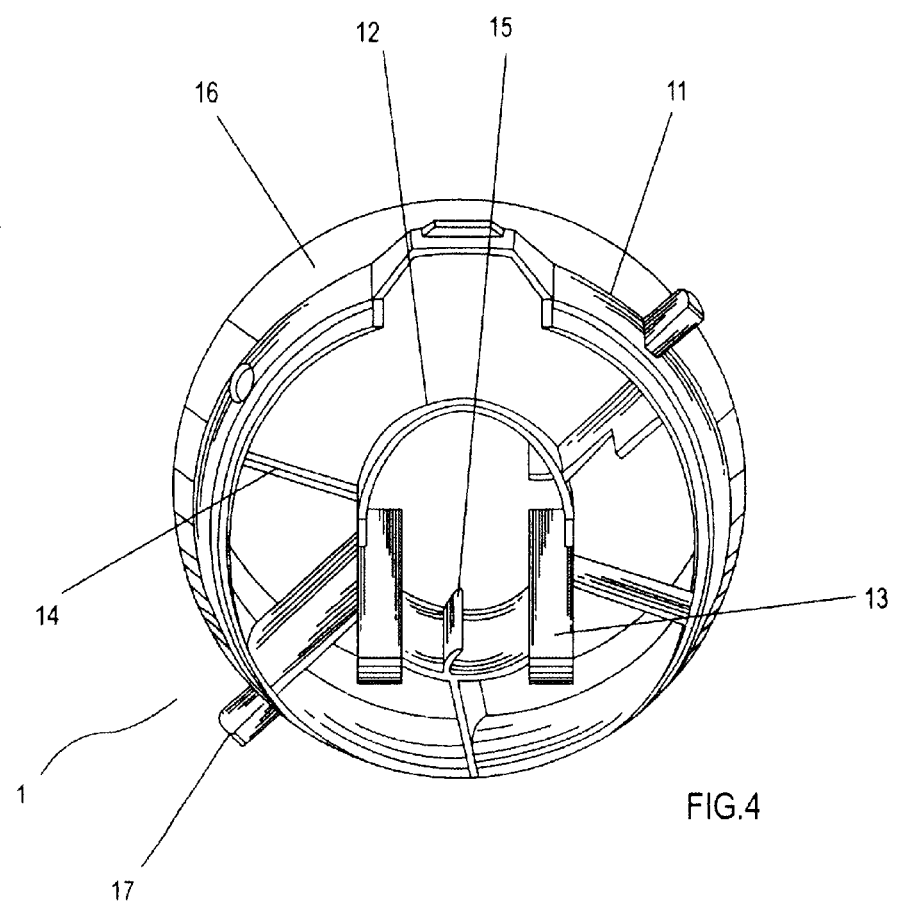
FIG. 4 is a perspective view of the ducted fan stator in FIG. 1.

The number of the stator guide blade 14 of the ducted fan stator 1 is generally 3–8. In FIG. 3, the number of the blades is 5. For a high power model airplane, the number can be 6 or more. The number of the inner ring guide blades 15 is generally 2–6. In FIG. 3, the number of the inner ring guide blades is 3, similarly for high power model airplane the number can be 5 or more. The five main blades 21 of the propeller 2 in the embodiment are specially designed according to the air dynamics. The number of the central conical blades 23 of the blade wheel is 4–10, generally 6 blades, for high power model airplane the number can be 8 or more, as shown in FIG. 3 and FIG. 4.

Figure 5:
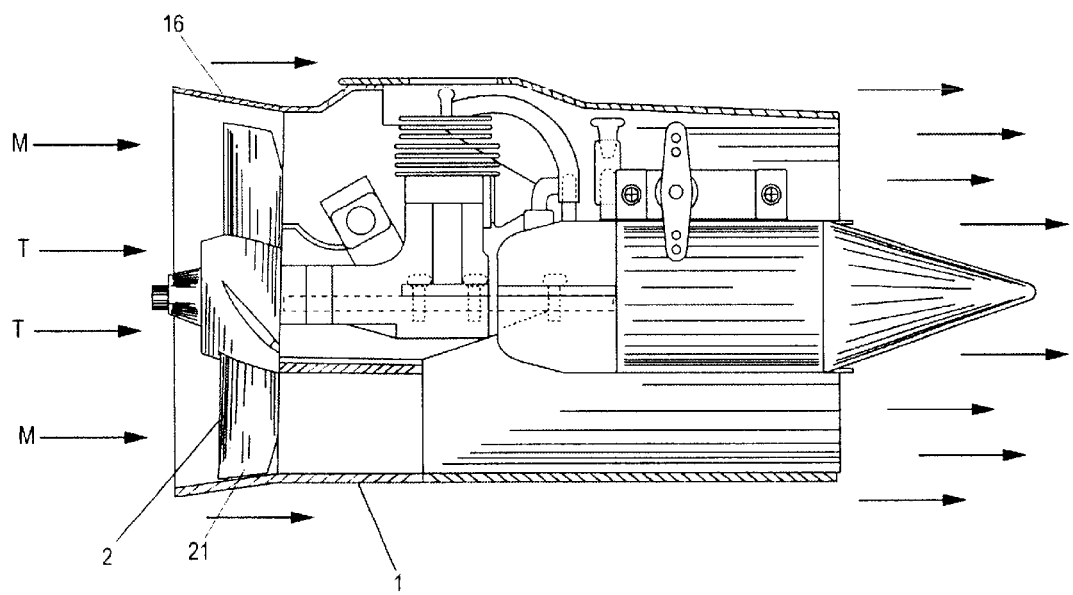
FIG. 5 is a schematic view of the flow state of the main air stream and central suction or dawn-in air stream when the ducted fan integrated power plan unit operates.

Referring to FIG. 5, in which is shown the operation principle of the ducted fan power plant unit having propeller with the central blade wheel. The power plant unit generally starts the engine through ignition. When the engine works, it rotates the propeller by means of its driving shaft, and actuates synchronously the rotation of the main blades 21 and the central conical blades 23. This synchronous rotation or actuation can produce two air streams at the same time, i.e. the main air stream M of the main blades 21 and the central suction or drawn-in air stream T of the central conical blades 23, wherein, the main air stream M produced by the rotation of the main blades 21 acts to draw in the air stream to make it pass through the intake port of the duct stator 1 and the tapering conical guide ring 16, during this process, because the air is subjected to a pressure, the speed of the air stream can be increased thereby the driving force or efficiency can be enhanced. Afterwards, the air stream flows into the interval space between the outer ring 11 and the inner ring 12 of the duct stator 1 and the stator guide blades 14 disposed therein; the central suction air flow T produced by the rotation of central conical blades 23 is the air stream suctioned from the spaced guide opening toward inside; at the same time, the centrifugal force produced by the rotation of central conical blades 23, formed on the two opposite radial walls of the spaced guide opening 24, accelerates the rearward exhaust of the air and makes the air stream enter into the inner ring opening of the inner ring and the inner ring guide blades 15. Then the main air stream M and the central suction air stream T produced by the synchronous rotation of the main blades 21 and the central conical blades 23 move rearwards toward the air exhaust duct 6. The joining movement of said two streams at the crankcase can increase the amount of air exhaust and the speed of the air stream, thereby increasing the efficiency. That is to say, in the operation course of the aid propeller 2, the stator guide blades 14 of the fan duct state 1 can guide the rotational air stream to the space between the inner ring 12 and outer ring 11 and exhaust it rearwards in a straight line manner, while the inner ring guide blades 15 acts to guide the rotational central suction air stream T produced by the central conical blades 23 of the blade wheel to the inner ring and exhaust it rearwards in a straight line manner, the exhausted air stream, under the action of inner ring blades 15, can flow rearwards while surrounding closely engine 3. In this way, the central suction air stream T of the central conical blades 23 can fundamentally cool directly the crankcase of the engine, increase the quantity of blown air around the engine to facilitate the mixture of the air and the fuel in the cylinder, so that the density of combined gas can be increased for combustion, at the same time, the joining of the two outer and inner air streams in a circulation manner can prevent the main air stream M alone from generating disordered flow when the main air stream leaves stator inner ring at high exhaust speed. From the above, it can be seen that, as compared with the prior art, the present utility model can raise significantly the output power of the engine and the driving force of the power plant unit for advancing the model airplane.

Figure 6:
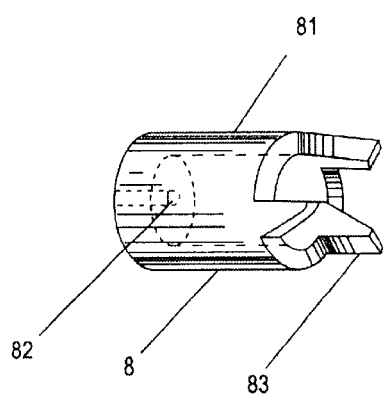
FIG. 6 is a perspective view of a pawl wheel starter for easy starting of the unit.

Now, referring to FIG. 6, the ducted fan integrated power plant unit according to the present utility model further includes a pawl wheel starter with which the engine can be easily started. The starter includes a pawl wheel 8 and a motor (not showed) in combination or connection with the pawl wheel 8. The motor is a low voltage D.C. motor. The pawl wheel 8 is a cylindrical member 81 having a bottom portion on one end and an opening on the other end. On the bottom portion, a connecting hole 82 is provided, which hole 82 is used for connecting with the motor, and on the end face of the opening end, three integrally formed protruding teeth 83 are provided. Each protruding tooth 83 has a inclining face with a certain inclining angle on one of the right and the left sides. After the power shaft of the motor is inserted into the connecting hole 82 and the pawl wheel 8 is fixed on the motor, and the protruding teeth 83 are inserted respectively into the three guide openings 24 between the central conical blades 23 of the central blade wheel, the motor is started. The pawl wheel 8 can make the propeller 2 to rotate, thereby the internal combustion engine 3 can be put into operation to achieve the starting of the engine 3. After the operation of the internal combustion engine 3 is started, the pawl wheel 8 can be withdrawn easily from the guide openings 24 of the central conical blades 23 and leave the propeller 2 by means of the inclining face of the protruding teeth 83. In this matter, the pawl wheel starter can match the power plant unit to start the engine 3, achieving the ideal effect of reliable starting, no slippage and easy maneuver and operation.

What is claimed is:

1. A ducted fan integrated power plant unit having a propeller with a central blade wheel, comprising:
   a ducted fan stator, which includes:
      an outer ring,
      an inner ring,
      several blade shaped connecting bars which connect the outer ring and the inner ring and which act as stator guide blades,
      a fixing support arranged on one side of the inner ring, and
      a conical air intake guide ring provided in a front portion of the outer ring for increasing an intake of air flow, an inner diameter of the guide ring being more large upstream than downstream;
   an air exhaust duct connected to a rear portion of the ducted fan stator, the air exhaust duct and the ducted fan stator having a common central axis;
   an internal combustion reciprocating engine having a fuel intake port and a power shaft;
   a fuel tank having a fuel supplying port, the engine and the fuel tank being mounted one after the other on the fixing support and being situated in the air exhaust duct, the fuel supplying port of the fuel tank being in communication with the fuel intake port of the internal combustion engine through a fuel pipe;
   a propeller, which includes several main blades, a conical retaining ring having a central shaft hole, and having a blade wheel that is defined by several central conical blades arranged in the retaining ring, the main blades being disposed on a periphery of the retaining ring the propeller being mounted on the power shaft of the engine through the central shaft hole of the retaining ring; and
   a cap, which is conical and mounted on an end portion of the power shaft and being situated in a center portion of the retaining ring of the propeller so that the central conical blades are exposed to an outside of the cap; and a spaced guide between two adjacent central conical blades communicates with an inner ring opening of the inner ring of the ducted fan stator.

2. The ducted fan integrated power plant unit having a propeller with central blade wheel according to claim 1, wherein a plurality of radially and uniformly distributed blade-shaped inner ring guide blades are disposed on an inner surface of the inner ring.

3. The ducted fan integrated power plant unit having a propeller with central blade wheel according to claim 1, wherein a rear end of the fuel tank includes tail cap.

4. The ducted fan integrated power plant unit having a propeller with central blade wheel according to claim 1, wherein an outer diameter of an end portion of the main blades is gradually reduced from a front to a rear, the end portion having approximately a same inclination angle as that of a peripheral surface of the air intake guide ring.

5. The ducted fan integrated power plant unit having a propeller with central blade wheel according to claim 1, wherein a number of the central conical blades is 4~10.

6. The ducted fan integrated power plant unit having a propeller with central blade wheel according to claim 1, wherein the outer ring of the ducted fan stator includes a fixing member used for mounting the power plant unit on a model airplane.

7. The ducted fan integrated power plant unit having a propeller with central blade wheel according to claim 1, wherein the inner ring includes 2 to 6 guide blades.

8. The ducted fan integrated power plant unit having a propeller with central blade wheel according to claim 1, wherein a number of the stator guide blades is 3~8.

9. The ducted fan integrated power plant unit having a propeller with central blade wheel according to claim 1, wherein an inner diameter of the air exhaust duct is gradually reduced from a front to a rear.

10. The ducted fan integrated power plant unit having a propeller with central blade wheel according to claim 1, further comprising a pawl wheel starter with which the engine is easily started, and including a pawl wheel that is a cylindrical member having a bottom portion on one end and an opening on another end, the bottom portion having a connecting hole for connecting with the power shaft of the motor, an end face of an opening end having three integrally formed protruding teeth, each protruding tooth having an inclining face with a certain inclining angle on one of the right and the left sides.

* * * * *